Feb. 7, 1961 R. G. FRIEDMAN 2,970,327
HEADER SLIDE COUNTER-BALANCE APPARATUS
Filed April 10, 1957
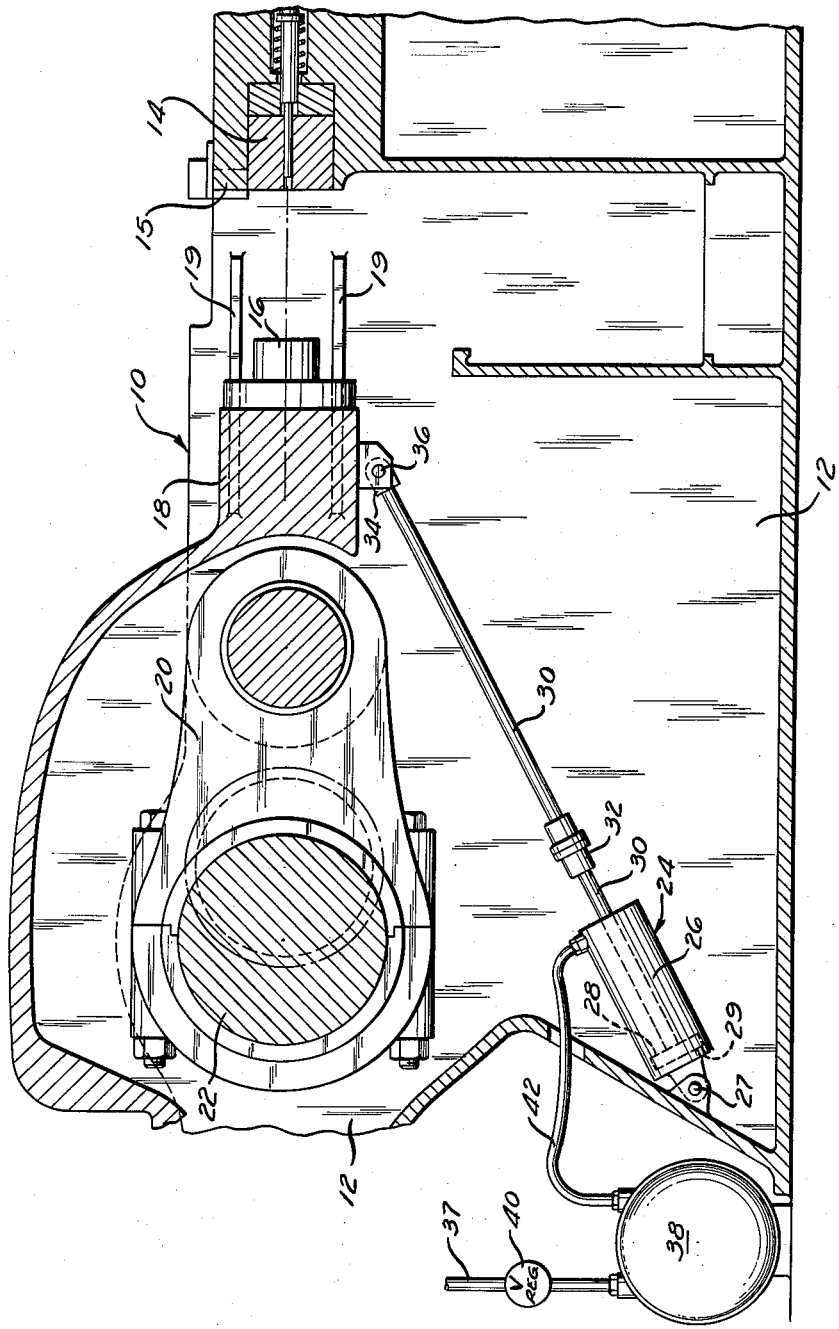
INVENTOR.
ROBERT G. FRIEDMAN
BY
RICHEY, WATTS, EDGERTON,
McNENNY & FARRINGTON
Donald W. Farrington
ATTORNEYS

United States Patent Office 2,970,327
Patented Feb. 7, 1961

2,970,327
HEADER SLIDE COUNTER-BALANCE APPARATUS

Robert G. Friedman, Tiffin, Ohio, assignor to The National Machinery Company, Tiffin, Ohio, a corporation of Ohio Filed Apr. 10, 1957, Ser. No. 651,924

5 Claims. (Cl. 10—15)

This invention relates to machines for making bolts and the like headed articles and more particularly relates to a novel air spring mechanism co-operable with such machines for controlling or restraining the reciprocation of a header slide with respect to a bed frame wherein each supports a fabricating die therein. Collision between the dies is prevented while the machine is operating in idle condition. This invention is particularly adaptable for use in machines as disclosed in Patent No. 2,139,936 to William L. Clouse, issued December 13, 1938.

In the operation of machines of the nature herein referred to, it frequently occurs that the machine is operated while no blank is disposed between the head fabricating dies thereof and that by virtue of a certain amount of wear and looseness of the machine bearings and other parts, the dies are permitted to contact each other or "kiss." Such "kissing" often results in cracking or other damage to the dies and, of course, is very undesirable.

Accordingly, it is a primary object of this invention to provide a counter balance cylinder co-operable with a machine of the type referred to, that is simple, efficient and effective in overcoming the above mentioned defects by continuously imparting a force tending to separate the header slide and the bed frame dies while the machine is in operation.

It is a further object of this invention to provide a counter balance cylinder co-operable with a machine of the type referred to that is adaptable for adjustably retaining the header slide and the bed frame dies in spaced relationship while operating without load.

It is a further object of this invention to provide a counter balance cylinder in a machine of the type referred to that accommodates for or "takes up" any clearance or looseness in the bearings or other parts of the machine.

It is a further object of this invention to provide a counter balance cylinder with a machine of the type referred to, that prevents rocking and other erratic motion of the header slide while in operation.

It is a further object of this invention to provide a counter balance cylinder co-operable with a machine of the type referred to, that facilitates improved die life and better trim of parts formed thereby.

It is a further object of this invention to provide a counter balance cylinder co-operable with a machine of the type referred to that enables closer operation of the dies without causing damage to each other and that gives greater accuracy in the product or products produced on the machine.

Other and further objects and advantages will become apparent from a more detailed description of the invention taken with the accompanying drawing in which:

The single figure illustrates a cross-sectional side view of a machine to which the invention is applied.

It is to be understood that this invention has applicability to machines employing various dies and punches for making nuts, nails and many other similar items, as well as bolts but that for simplicity in description the same will be set forth as applicable to a boltmaking machine only.

Referring now more particularly to the single figure of the drawing, 10 represents generally a boltmaking machine, or header, to which this invention is particularly adaptable, having a massive bed frame 12 for supporting the various machine components. A fixed die 14 is mounted in a die breast 15 of the frame 12 and a die 16 movable into proximity with die 14 is mounted on a header slide 18 which in turn is reciprocated along suitable guideways 19 by a pitman 20 which is reciprocated by a crankshaft 22 journalled in frame 12.

In a manner more clearly explained in the above cited patent, in operation of machine 10, stock pieces may be placed against bed frame die 14 to be formed by blows of header slide die 16 against the piece. While in operation, it occurs that header slide die 16 in its reciprocation moves into proximity to bed frame 14 when no stock piece is placed thereagainst. By reason of certain clearances between the machine components such as crankshaft 22 and pitman 20, as may develop from prolonged use of the machine, header slide die 16 may be thrust into contact with bed frame die 14 at the extreme of its stroke. As a consequence header slide and bed frame dies 14 and 16 contact each other with the result that certain damage thereto is likely and considerable expense in replacement thereof is likely.

According to this invention an air spring 24 is provided between header slide 18 and frame 12 for continuously urging header slide 18 and consequently header slide die 16 away from bed frame die 14. Spring 24 also is disposed to provide a lateral component of tension to the header slide 18 to prevent it from rocking and to maintain the same in even, linear to and fro motion.

Spring 24 comprises a cylinder 26 pivotally mounted at one end about a pin 27 preferably fixed on machine 10. A piston 28 is slidable in cylinder 26 and is centrally connected to a bipartite connecting rod 30 having a coupling 32 to facilitate assembly thereof. Rod 30 is suitably attached to header slide 18 through a socket 34 which is pivotal with respect to header slide 18 about a pin 36. A suitable vent 29 is provided at one end of cylinder 26 to avoid compression in cylinder 26 below piston 28.

Communication between a suitable source of air under high pressure and a surge reservoir 38 is provided through a pipe 37 and a pressure regulator 40 which is effective to maintain the pressure in reservoir 38 at a pressure considerably less than that of the air source. A suitable, flexible conduit 42 is provided for communication between surge reservoir 38 and one end of cylinder 26 to admit air under pressure thereinto to effect a retarding force to piston 28, rod 30 and header slide 18.

Air reservoir 38 and cylinder 26 are volumetrically proportioned in an approximate ratio of 10 to 1 and air cylinder 26 and piston 28 are preferably sufficiently large to enable use of pressure considerably reduced from line pressure conventionally utilized industrially to facilitate a stabilizing and retarding influence on header slide 18 to accomplish the objects and advantages herein explained. Such reduced pressure is advantageous in that obtaining effective air seals is simplified. The respective lengths of cylinder 26 and rod 30 between pivots is preferably selected to effect a small angular motion thereof in response to reciprocatory movement of header slide 18.

In the operation of this invention, air under reduced pressure is supplied to reservoir 38 through regulator 40 and is therefrom applied to cylinder 26 through flexible conduit 42. Accordingly, a force is applied against piston 28 and to header slide 18 through connecting rod 30 that is substantially constant in value and that has longitudinal and transverse components.

Reciprocation of header slide 18 is of sufficient force to reciprocate piston 28 against the force of air under pressure in cylinder 26 whereby during forward strokes of header slide 18 air in cylinder 26 is forced through conduit 42 into reservoir 38. Since reservoir 38 is many times as large as cylinder 26 the pressure variations in the system are small and the pressure in the system remains approximately a constant to effect a constant retarding and stabilizing influence on header slide 18 in all positions thereof.

In one preferred embodiment of the invention optimum results were obtained in reducing line pressure at 90 pounds per square inch to 30 pounds per square inch for application to cylinder 26 and the lengths of cylinder 26 and rod 30 were such as to provide less than 3 degrees angular motion thereof in response to full reciprocation of approximately one foot of header slide 18.

It is noted that according to this invention desirable results are obtained in that "kissing" of the dies is avoided and further in that tilting or cocking of the header slide during its reciprocatory movement along guideways 19 is also avoided. By reason of the axial retarding effort of the counter balance cylinder, the header slide is restrained sufficiently at the extreme of its stroke to "take up" any slack that may exist in the machine parts when operating without load. The radial forces applied to the header slide by the counter balance cylinder are effective to restrain the header slide from rocking or tilting during its motion along guideways 19 and effect an even and smooth to and fro motion thereof.

As is known, the action of the crankshaft 22 and pitman 20 in reciprocating the header slide along the guideways 19 is to accelerate the slide during the first quadrant of crankshaft motion from one dead center position, and decelerate the slide during the next quadrant. The axial retarding effort of the air spring 24, or the net component of force parallel to the guideways 19, prevents contact between the dies by preventing the slide from overrunning the pitman during deceleration of the slide while approaching the die breast 15.

As also known, the pitman 20 is disposed at varying angles to the guideway 19 during slide reciprocation, so that the accelerating and decelerating forces transmitted through the pitman tend to cock or move the slide from one side to the other of the guideways 19. The radial forces applied to the slide by the air spring 24 or the net component of force perpendicular to the guideways 19, prevents such rocking or tilting by pressing the slide against the adjacent side of the guideway, or downwardly in the illustrated embodiment. Since a component perpendicular to the guideways 19 is continuously applied by the air spring 24 the force is applied during all parts of the complete cycle of reciprocation during which components of force from the pitman 20 tend to move the slide in the opposite direction.

While this invention has been described with reference to a certain specific embodiment thereof it is understood that numerous alterations and variations may be made without deviating or departing from the spirit or scope of the invention as set forth in the appended claims.

I claim:

1. In a header including a bed-frame having a die breast and guideways, a header slide reciprocably mounted in said guideways for movement toward and away from said die breast, and a crankshaft journaled on said bed-frame and connected by a pitman to said header slide to reciprocate the same, counter-balancing apparatus comprising spring means connected at one point on said bed-frame and at another point on said header slide, a line through said connecting points intersecting said header slide at an acute angle at all times during the reciprocation of said header slide, said spring means applying a force on said header slide in a direction to exert a component force on said slide urging the same away from said die breast at least throughout the deceleration of said slide in approaching said die breast.

2. In a header including a bed-frame having a die breast and guideways, a header slide reciprocably mounted in said guideways for movement toward and away from said die breast, and a crankshaft journaled in said bed-frame and connected by a pitman to said header slide to reciprocate the same, counter-balancing apparatus comprising spring means connected at one point to said bed-frame and at another point to said header slide, a line through said connecting points intersecting the path of movement of said header slide at an acute angle at all times during the reciprocation of said header slide, said spring means supplying a force to said header slide in a direction to apply a net component of force to said slide urging the same away from said die breast throughout the reciprocation of said slide in both directions.

3. In a header including a bed-frame having a die breast and guideways, a header slide reciprocably mounted in said guideways for movement toward and away from said die breast and a crankshaft journaled in said bed-frame and connected by a pitman to said header slide to reciprocate the same, counter-balance apparatus comprising an air cylinder pivoted to said bed-frame, a piston in said cylinder, a connecting rod secured to said piston and pivoted to said header slide, the pivotal points between said cylinder and bed-frame and between said connecting rod and slide being positioned on a line intersecting said header slide at an acute angle at all times during the reciprocation of said header slide, and means supplying air under pressure to said cylinder pressing said piston in a direction to exert a component of force on said slide urging the same away from said die breast at least throughout deceleration of said slide in approaching said die breast.

4. In a header including a bed-frame having a die breast and guideways, a header slide reciprocably mounted in said guideways for movement toward and away from said die breast and a crankshaft journaled in said bed-frame and connected by a pitman to said header slide to reciprocate the same, counter-balance apparatus comprising an air cylinder pivoted to said bed-frame, a piston in said cylinder, a connecting rod fixed to said piston and pivoted to said header slide, the pivot points of said cylinder and said connecting rod being positioned on a line intersecting the path of movement of said header slide at an acute angle at all times during the reciprocation of said header slide, and means supplying compressed air to said cylinder pressing said piston in a direction to apply a net component of force to said slide urging the same away from said die breast throughout the reciprocation of said slide in both directions.

5. In a header including a bed-frame having a die breast and guideways, a header slide reciprocably mounted in said guideways for movement toward and away from said die breast and a crankshaft journalled in said bed-frame and connected by a pitman to said header slide to reciprocate the same, a counter-balance assembly comprising an air cylinder, a piston in said cylinder and a connecting rod fixed to said piston, said assembly being pivoted at one end to said bed-frame and at the other end to said header slide, the pivot points being positioned on a line intersecting said header slide at an acute angle at all times during the reciprocation of said header slide, and means supplying air under pressure to said cylinder pressing said piston in a direction to exert a component of force on said slide urging the same away from said die breast at least throughout deceleration of said slide in approaching said die breast.

References Cited in the file of this patent
UNITED STATES PATENTS

| 943,768 | Clouse | Dec. 21, 1909 |
| 1,872,242 | Byerlein | Aug. 16, 1932 |
| 2,141,951 | Criley | Dec. 27, 1938 |
| 2,218,215 | O'Leary | Oct. 15, 1940 |
| 2,767,818 | Huling | Oct. 23, 1956 |